US006804750B2

(12) United States Patent
LaBerge

(10) Patent No.: US 6,804,750 B2
(45) Date of Patent: Oct. 12, 2004

(54) TECHNIQUE FOR REDUCING MEMORY LATENCY DURING A MEMORY REQUEST

(75) Inventor: Paul A. LaBerge, Shoreview, MN (US)

(73) Assignee: Micron Technology, Inc., Boise, ID (US)

(*) Notice: Subject to any disclaimer, the term of this patent is extended or adjusted under 35 U.S.C. 154(b) by 55 days.

(21) Appl. No.: 10/054,255

(22) Filed: Jan. 22, 2002

(65) Prior Publication Data

US 2003/0140202 A1 Jul. 24, 2003

(51) Int. Cl.[7] .............................................. G06F 12/00
(52) U.S. Cl. ...................... 711/154; 711/138; 711/144; 714/12
(58) Field of Search ................................ 711/154, 138, 711/144; 714/12

(56) References Cited

U.S. PATENT DOCUMENTS

| | | | | |
|---|---|---|---|---|
| 4,851,993 A | * | 7/1989 | Chen et al. ................. | 711/138 |
| 5,295,258 A | * | 3/1994 | Jewett et al. ................. | 714/12 |
| 6,347,345 B1 | * | 2/2002 | Cheon ........................ | 710/20 |
| 6,546,465 B1 | * | 4/2003 | Bertone ...................... | 711/144 |
| 2002/0095559 A1 | * | 7/2002 | Mekhiel ..................... | 711/168 |

* cited by examiner

Primary Examiner—Mano Padmanabhan
Assistant Examiner—Mehdi Namazi
(74) Attorney, Agent, or Firm—Fletcher Yoder

(57) ABSTRACT

A technique for reducing the latency associated with a memory read request. A bypass path is provided to direct the address of a corresponding request to a memory controller. The memory controller initiates a speculative read request to the corresponding address location. In the meantime, the original request is decoded and directed to the targeted area of the system. If the request is a read request, the memory controller will receive the request, and after comparing the request address to the address received via the bypass path, the memory controller will cancel the request since the speculative read has already been issued. If the request is directed elsewhere or is not a read request, the speculative read request is cancelled.

19 Claims, 3 Drawing Sheets

TECHNIQUE FOR REDUCING MEMORY LATENCY DURING A MEMORY REQUEST

BACKGROUND OF THE INVENTION

1. Field of the Invention

The present invention relates generally to memory subsystems, and more specifically, to a technique for reducing memory latency during a memory request.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In today's complex computer systems, speed, flexibility, and reliability in timing control are issues typically considered by design engineers tasked with meeting customer requirements while implementing innovations which are constantly being developed for the computer systems and their components. Computer systems typically include a plurality of memory devices which may be used to store programs and data and may be accessible to other system components such as processors or peripheral devices. Typically, memory devices are grouped together to form memory modules, such as dual-inline memory modules (DIMMs). Computer systems may incorporate numerous modules to increase the storage capacity in the system.

Each request to memory has an associated latency period corresponding to the interval of time between the initiation of the request from a requesting device, such as a processor, and the time the requested data is delivered to the requesting device. A memory controller may be tasked with coordinating the exchange of requests and data in the system between requesting devices and each memory device such that timing parameters, such as latency, are considered to ensure that requests and data are not corrupted by overlapping requests and information.

In memory sub-systems, memory latency is a critical design parameter. Reducing latency by even one clock cycle can significantly improve system performance. In typical systems, a processor, such as a microprocessor, may initiate a read command to a memory device in the memory sub-system. During a read operation, the initiating device will deliver the read request via a processor bus. The processor address and command information from the processor bus is decoded to determine the targeted location, and in the case of a read request, the request is delivered to the memory controller. Once the command is received by the memory controller, the memory controller can issue the read command on the memory bus to the targeted memory device. Because requests from the processor may be directed to other portions of the system, such as an I/O bus, a plurality of devices such as buffers and decoders, are generally provided to intercept the delivery of requests from the processor bus such that they may be directed to the memory controller or other targeted locations, such as the I/O bus. Disadvantageously, by adding buffers and decoders along the request path to provide proper request handling, cycle latency is increased thereby slowing the overall processing speed of the request.

The present invention may address one or more of the concerns set forth above.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
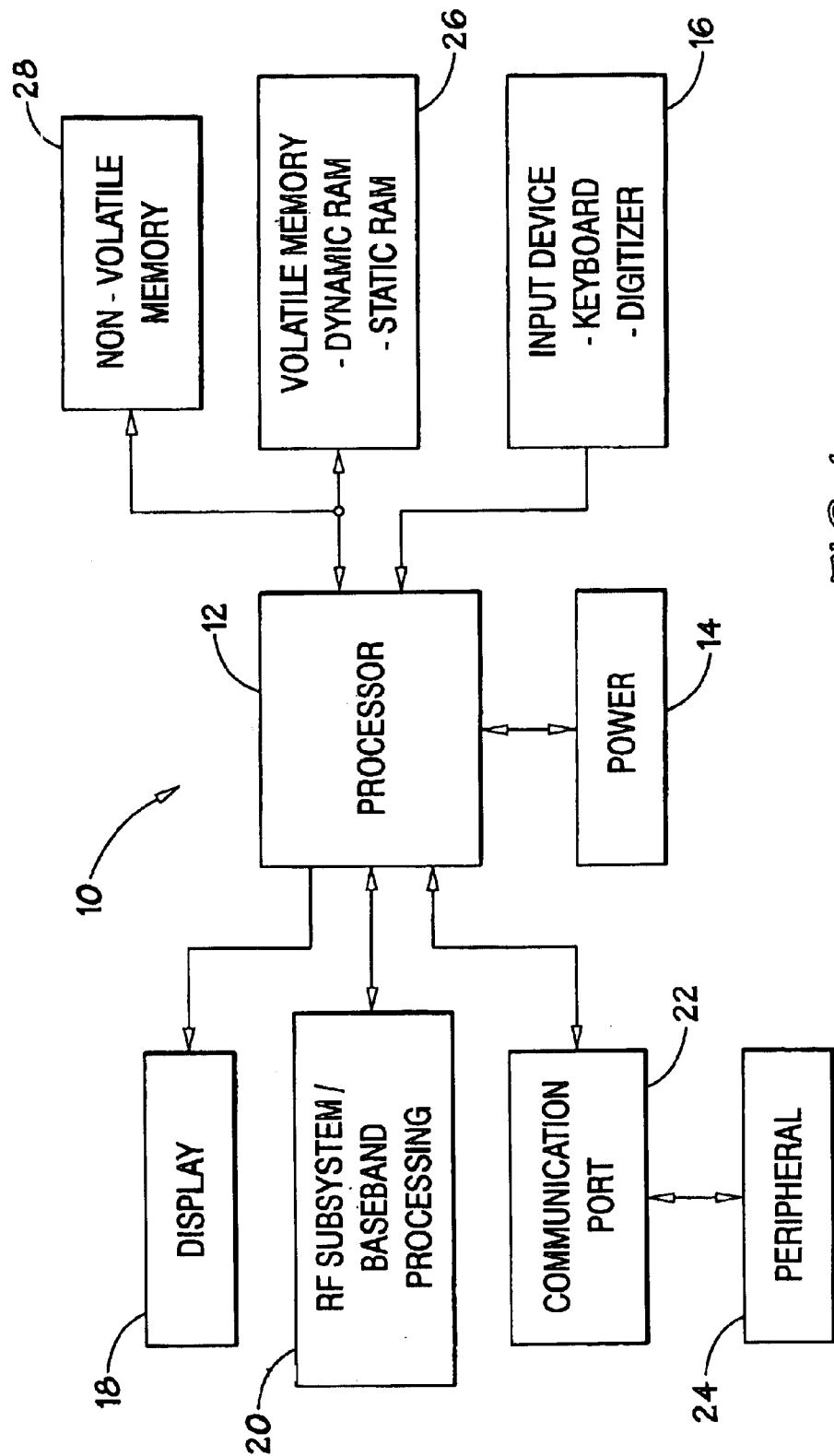
FIG. 1 illustrates a block diagram of an exemplary processor-based system.

Turning now to the drawings, and referring initially to FIG. 1, a block diagram depicting an exemplary processor-based system, generally designated by reference numeral 10, is illustrated. The system 10 may be any of a variety of types such as a computer, pager, cellular phone, personal organizer, control circuit, etc. In a typical processor-based device, a processor 12, such as a microprocessor, controls the processing of system functions and requests in the system 10. Further, the processor 12 may comprise a plurality of processors which share system control.

The system 10 typically includes a power supply 14. For instance, if the system 10 is a portable system, the power supply 14 may advantageously include permanent batteries, replaceable batteries, and/or rechargeable batteries. The power supply 14 may also include an AC adapter, so the system 10 may be plugged into a wall outlet, for instance. The power supply 14 may also include a DC adapter such that the system 10 may be plugged into a vehicle cigarette lighter, for instance. Various other devices may be coupled to the processor 12 depending on the functions that the system 10 performs. For instance, a user interface 16 may be coupled to the processor 12. The user interface 16 may include buttons, switches, a keyboard, a light pen, a mouse, and/or a voice recognition system, for instance. A display 18 may also be coupled to the processor 12. The display 18 may include an LCD display, a CRT, LEDs, and/or an audio display, for example. Furthermore, an RF sub-system/baseband processor 20 may also be couple to the processor 12. The RF sub-system/baseband processor 20 may include an antenna that is coupled to an RF receiver and to an RF transmitter (not shown). A communications port 22 may also be coupled to the processor 12. The communications port 22 may be adapted to be coupled to one or more peripheral devices 24 such as a modem, a printer, a computer, or to a network, such as a local area network, remote area network, intranet, or the Internet, for instance.

Generally, the processor 12 controls the functioning of the system 10 by implementing software programs. The memory is coupled to the processor 12 to store and facilitate execution of various programs. For instance, the processor 12 may be coupled to the volatile memory 26 which may include Dynamic Random Access Memory (DRAM) and/or Static Random Access Memory (SRAM). The processor 12 may also be coupled to non-volatile memory 28. The non-volatile memory 28 may include a read-only memory (ROM), such as an EPROM, and/or flash memory to be used in conjunction with the volatile memory. The size of the ROM is typically selected to be just large enough to store any necessary operating system, application programs, and fixed data. The volatile memory 26 on the other hand, is typically quite large so that it can store dynamically loaded applications and data. Additionally, the non-volatile memory 28 may include a high capacity memory such as a tape or disk drive memory.

Figure 2:
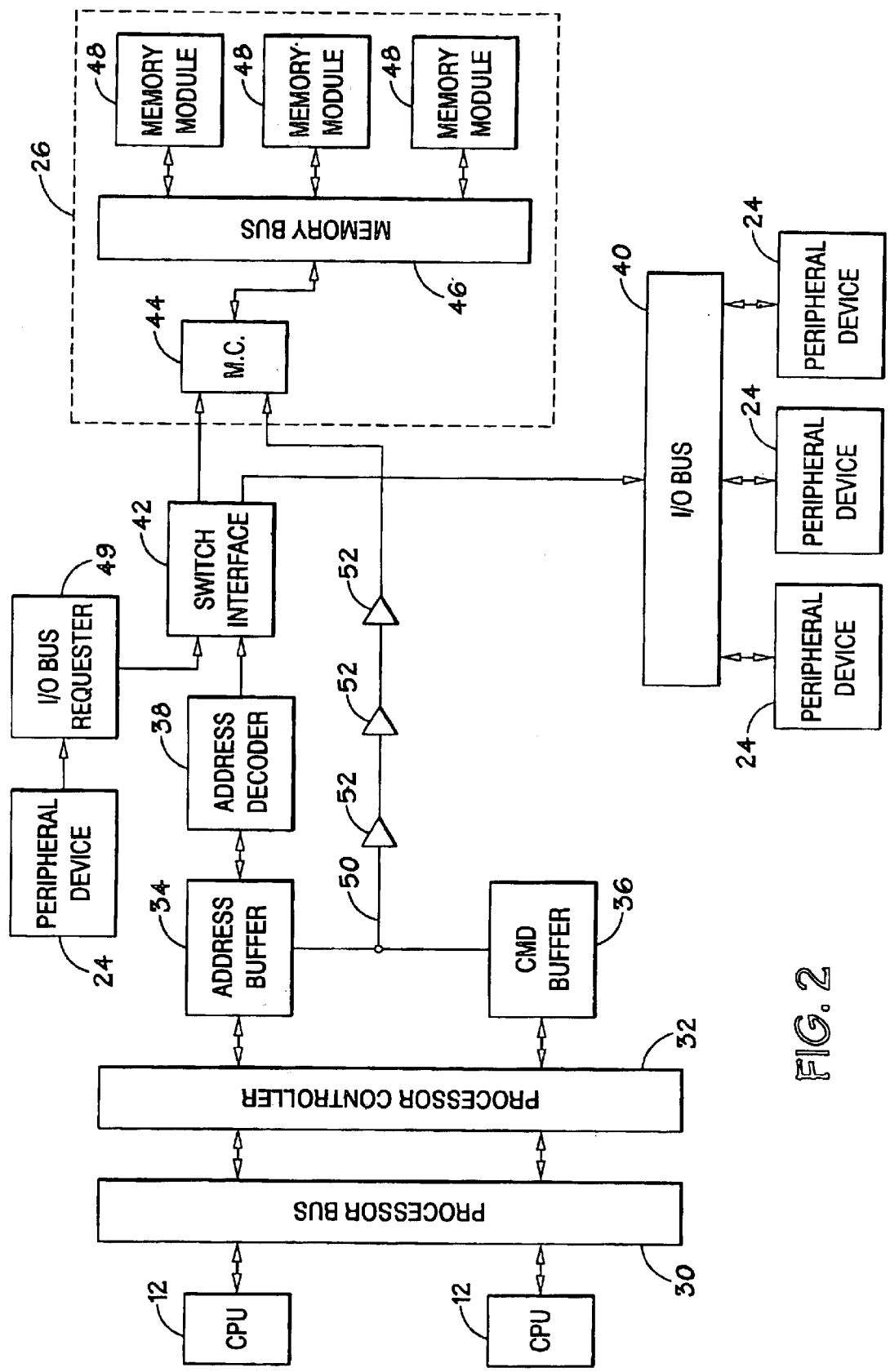
FIG. 2 illustrates a block diagram of an exemplary system in accordance with the present techniques.

FIG. 2 illustrates a block diagram of an exemplary system in accordance with the present techniques. As previously discussed, a processor, such as a CPU 12, may initiate a request to another portion of the system via a processor bus 30. As can be appreciated by those skilled in the art, a plurality of CPUs 12 may be arranged along the processor bus 30 such that the processor bus 30 electrically couples each of the CPUs 12 to each other as well as to the remainder of the system. When a request is initiated by the CPU 12 via the processor bus 30, the request may be received by a processor controller 32. The processor controller 32 is generally tasked with coordinating timing and handshaking protocol from any of the CPUs 12 along the processor bus 30. Each request that is sent from the processor controller 32 includes a command segment defining the requested operation by command type (e.g., read, write, etc.) and an address segment defining the address to which the request should be delivered. The processor address is defined by the requesting device (here the CPU 12) and identifies the target location, such as the system memory or a peripheral device, to which the request is being directed. The address segment and the command segment may be temporarily stored in respective queuing structures such as an address buffer 34 and a command buffer 36.

Typically, an address decoder 38 is provided to sort the request to the appropriate location by decoding the destination address provided by the CPU 12. Thus, the address decoder 38 receives the destination address from the address buffer 34 and flags the request such that it will be directed to the appropriate portion of the system such as the memory 26 or the I/O bus 40. The address decoding performed by the address decoder 38 generally takes one to three clock cycles. The address decoder 38 may also be configured to determine if there is a posted write to the corresponding address location of a read request and if so, re-prioritize the requests such that the read request produces the most current data. A switch interface 42 receives the decoded destination addresses from the address decoder 38 and directs the requests to their targeted locations in priority order.

From the switch interface 42, the request may be directed to the memory 26 or an I/O bus 40, for example. The I/O bus 40 may comprise a number of buses such as PCI, PCIX, AGP, etc., depending on the chip set and system configuration. The I/O bus 40 may provide access to a number of peripheral devices, such as peripheral devices 24 which may include a modem, printer, computer, or network, for example. The memory 26 includes a memory controller 44 which is configured to control the access to and from the memory modules 48 via the memory bus 46. In one exemplary embodiment, the memory modules may be dual inline memory modules (DIMMs), each including a plurality of memory devices such as Synchronous Dynamic Random Access Memory (SDRAM) devices. Further, it should be noted that the peripheral devices 24 may also initiate requests to the memory controller 44. In this instance, the peripheral devices 24 act as a master, initiating requests through an I/O bus register 49.

As previously discussed, the address decoding for processor-based requests may add one or more clock cycles to the request latency. Since reduction in request latency is generally desirable, a bypass path 50 may be incorporated to bypass the address decoder 38 for memory read requests and thereby reduce the request latency for read requests directed to the memory 26 by one or more clock cycles. In one embodiment, the memory controller 44 is provided with a copy of the address corresponding to a request via the bypass path 50. The memory controller 44 then issues a "speculative" read request to the memory device corresponding to the address. By issuing a read request to the address received via the bypass path 50, the delay in issuing the read request which results from the processing by the address decoder 38 is eliminated from the request cycle time. Generally, this technique assumes that the request is a read request. Alternatively, the request may include a read/write bit from the processor bus 30. If the assumption is correct, cycle time for processing the request will be reduced.

Since every request from the processor controller 32 may be delivered to the memory controller 44 via the bypass path 50, it is possible that the memory controller may receive an address other than a memory address. For instance, if the request is directed to the I/O bus, the address information received at the memory controller 44 via the bypass path 50 will not correspond to a memory address. In this situation, the speculative read cannot be issued and the address may be immediately discarded.

After issuing the speculative read request, the memory controller 44 tracks the incoming requests from the normal processor request path (i.e. via the address decoder 38 and the multiplexor 42) and compares the address information corresponding to the request received from the normal path to the address for which the speculative read request was issued (i.e. the request delivered via the bypass path 50). The comparison may be performed by a simple bit comparator circuit in the memory controller 44. If a matching address for the request is found and the request is a read request, the speculative read is verified and the read data is returned. The slower read request, delivered via the normal path, (which lags behind the speculative read request by one or more clock cycles) is discarded. If, on the other hand, no match is found before the speculative read is completed, then the speculative read request is canceled and/or the data acquired during the speculative read request is discarded. The latter condition indicates that the original request was not directed to the memory 26, or is not a read request, and the speculative read request is therefore unnecessary.

In the case of a request directed to the I/O bus, rather than immediately discarding an address which does not correspond to a memory address, the address received at the memory controller 44 via the bypass path 50 may be held for a number of clock cycles. If a request is not received at the memory controller 44 via the normal path within the predetermined number of clock cycles (e.g. the CAS latency), the address can then be discarded since the memory controller assumes that a matching request will never arrive.

Alternately, the memory controller 44 may include a small bypass queue to store two or more bypass requests. If an unidentifiable address is received at the memory controller 44 (such as an I/O address), the address is held until the comparator receives the next incoming request delivered via the decoder. If the address corresponded to an I/O request, the next request which is received at the memory controller 44 via the address decoder 38, will actually be a subsequent request. In the time it takes the subsequent request to reach the memory controller 44 via the decoder 38, at least one other request will have arrived at the memory controller via the bypass path 50. This request may be stored in the bypass queue, and a speculative read request will be initiated to the corresponding address. Once the subsequent request reaches the memory controller 44 (assuming it was a memory request), there are two or more requests (received via the bypass path 50) which are compared to the address of the subsequent request. In this example, the request received at the memory controller 44 via the address decoder 38 may be compared to the first address in the queue. Since the addresses do not match, the first queue entry will be discarded. Next, the request is compared to the second entry in the queue. If there is a match and the request is a read request, the request can then be discarded and the data retrieved by the speculative read request can be delivered to the requesting device. In one embodiment, the size of the bypass queue is relatively small (holding 2–4 address entries). However, it may be advantageous to implement larger bypass queues.

When requests are forced to travel long distances across the silicon, timing and signal integrity may be lost. Thus, the present exemplary embodiment may incorporate repeaters 52 along the bypass path such that timing is not lost due to resistance across the chip. The repeaters 52 repeat the request periodically as the signal traverses the silicon. As can be appreciated by those skilled in the art, repeaters may or may not be used and the number of repeaters used may vary depending on the system.

As can also be appreciated by those skilled in the art, the present technique of incorporating a bypass path and initiating a speculative request based on a given event (such as the issuing of a read request) could be incorporated for other request types. Further, bypass paths could be provided for other request destinations, such as the I/O bus. If a majority of system requests are directed to a particular area of the system and/or correspond to a particular request type, it may be advantageous to provide a bypass path to circumvent the delay associated with the component tasked with directing the destination of the request, here the address decoder 38.

Figure 3:
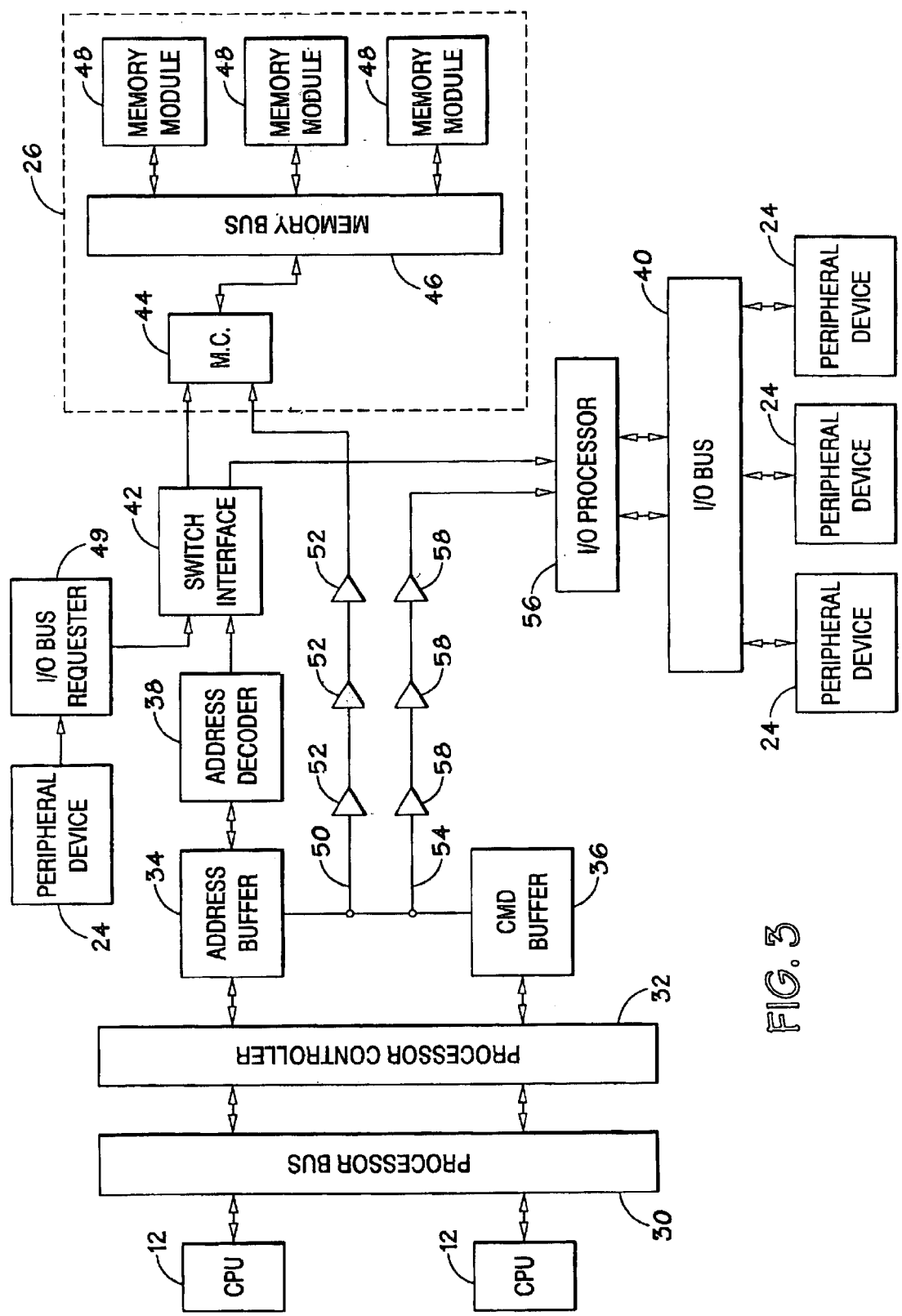
FIG. 3 illustrates a block diagram of an alternate exemplary system in accordance with the present techniques.

FIG. 3 illustrates an alternate exemplary embodiment of the system illustrated in FIG. 2. Here, a second bypass path 54 is directed to an I/O processor 56. Thus, each address corresponding to all requests delivered through the processor controller may be delivered to each of the memory controller (via the bypass path 50) and the I/O processor 56 (via the second bypass path 54). As with the memory controller 44, the I/O processor 56 initiates a speculative read request to a corresponding device, here a peripheral device 24, such that if the request is a read request directed to a peripheral device 24, the latency time for completing the transaction can be reduced by 1–3 clock cycles. Each of the above embodiments and descriptions relating to the memory controller 44 and the bypass path 50, can be applied to the I/O controller 56 and the second bypass path 54, as can be appreciated by those skilled in the art. Further, as with the bypass path 50, the repeaters 58 may be used on the second bypass path 54 to improve signal quality.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system for processing a request comprising:
   a memory system configured to receive a request, wherein the memory system comprises one or more memory devices and a memory controller configured to control access to the one or more memory devices;
   a processor configured to initiate a request, wherein the request comprises an address and a command type corresponding to a target component;
   a decoder operably coupled between the target component and the processor and configured to receive the request from the processor and produce a decoded request to the target component based on the address; and
   a bypass path configured to receive the request from the processor and produce a bypass request to the target component without implementing the decoder;
   wherein the memory controller is operably coupled to each of the decoder and the bypass path; and
   wherein the memory controller comprises a comparator circuit configured to compare the decoded request received from the decoder and the bypass request received from the bypass path.

2. The system, as set forth in claim 1, wherein the one or more memory devices comprise synchronous dynamic random access memory (SDRAM) devices.

3. The system, as set forth in claim 1, wherein the memory controller is configured to cancel the decoded request if the decoded request is the same as the bypass request.

4. The system, as set forth in claim 1, wherein the memory controller is configured to cancel the bypass request if the bypass request is different than the decoded request.

5. The system, as set forth in claim 1, wherein the bypass path comprises one or more repeaters.

6. A method of reducing cycle latency comprising the acts of:
   initiating a request by a processor, wherein the request comprises an address and a command type corresponding to a request destination;
   simultaneously directing the request to a decoder via a first path and directing the address to a memory controller via a second path;
   receiving the address at the memory controller via the second path at a first time; and
   initiating a speculative read request to the address received via the second path.

7. The method of reducing cycle latency, as set forth in claim 6, comprising the acts of:
   if the request comprises a memory request, receiving the request at the memory controller via the first path at a second time, wherein the second time is after the first time; and
   comparing the request received via the first path with the address received via the second path.

8. The method of reducing cycle latency, as set forth in claim 7, comprising the act of canceling the request received via the first path if the request is a read request comprising the same address as the address received via the second path.

9. The method of reducing cycle latency, as set forth in claim 7, comprising the act of canceling the speculative read request if the request received via the first path is not a read request.

10. The method of reducing cycle latency, as set forth in claim 7, comprising the act of canceling the speculative read request if the address of the request received via the first path is not the same as the address received via the second path.

11. The method of reducing cycle latency, as set forth in claim 6, wherein the act of simultaneously directing comprises the act of simultaneously directing the request from a processor controller to the decoder and directing the address to the memory controller.

12. The method of reducing cycle latency, as set forth in claim 6, wherein the act of simultaneously directing comprises the act of directing the address and command type to the memory controller via the second path.

13. A method of reducing cycle latency comprising the acts of:

initiating a request wherein the request comprises an address and a command type corresponding to a request destination;

simultaneously directing the request to a decoder via a first path and directing the address and command type to a memory controller via a second path;

receiving the address at the memory controller via the second path at a first time; and initiating a speculative read request to the address received via the second path.

14. The method of reducing cycle latency, as set forth in claim 13, comprising the acts of:

if the request comprises a memory request, receiving the request at the memory controller via the first path at a second time, wherein the second time is after the first time; and comparing the request received via the first path with the address received via the second path.

15. The method of reducing cycle latency, as set forth in claim 14, comprising the act of canceling the request received via the first path if the request is a read request comprising the same address as the address received via the second path.

16. The method of reducing cycle latency, as set forth in claim 14, comprising the act of canceling the speculative read request if the request received via the first path is not a read request.

17. The method of reducing cycle latency, as set forth in claim 14, comprising the act of canceling the speculative read request if the address of the request received via the first path is not the same as the address received via the second path.

18. The method of reducing cycle latency, as set forth in claim 13, wherein the act of initiating a request comprises the act of initiating a request by a processor.

19. The method of reducing cycle latency, as set forth in claim 18, wherein the act of simultaneously directing comprises the act of simultaneously directing the request from a processor controller to the decoder and directing the address to the memory controller.

* * * * *